United States Patent [19]

Hamasaki

[11] Patent Number: 5,379,068
[45] Date of Patent: Jan. 3, 1995

[54] SOLID STATE IMAGING DEVICES FOR PRODUCING NORMAL AND MIRROR IMAGE SIGNALS WITH THE USE OF A REVERSIBLE SHIFT REGISTER

[75] Inventor: Masaharu Hamasaki, Kanagawa, Japan

[73] Assignee: Sony Corporation, Tokyo, Japan

[21] Appl. No.: 53,220

[22] Filed: Apr. 28, 1993

[30] Foreign Application Priority Data

May 11, 1992 [JP]  Japan .................................. 4-146608

[51] Int. Cl.[6] .......................................... H04N 5/335
[52] U.S. Cl. ...................................... 348/322; 348/316
[58] Field of Search ...................... 358/213.11, 213.15, 358/213.27, 213.28, 213.29; 348/311, 315, 294, 300, 302, 307, 308, 314, 316, 320, 321, 322, 323; H04N 5/335

[56] References Cited

U.S. PATENT DOCUMENTS

| | | | |
|---|---|---|---|
| 4,644,404 | 2/1987 | Tabei | 358/213.19 |
| 4,668,990 | 5/1987 | Kondo et al. | 358/213.23 |
| 5,060,072 | 10/1991 | Hojo et al. | 358/213.11 |
| 5,274,459 | 12/1993 | Hamasaki | 358/213.11 |
| 5,276,521 | 1/1994 | Mori | 358/213.31 |

Primary Examiner—Joseph Mancuso
Assistant Examiner—Ngoc-Yen Vu
Attorney, Agent, or Firm—William S. Frommer; Alvin Sinderbrand

[57] ABSTRACT

Solid state imaging devices include an image sensor having a two-dimensional matrix of picture elements arranged horizontally and vertically. A vertical scanning circuit selects horizontal lines of picture elements within the two-dimensional matrix in a predetermined order for reading the picture elements. A horizontal scanning circuit coupled with a plurality of vertical lines joining vertically spaced ones of the picture elements serves to select picture elements in the horizontal lines selected by the vertical scanning circuit to output image signals therefrom. The horizontal scanning circuit is operative to scan the picture elements of the selected horizontal lines through one side of the two-dimensional matrix in a first horizontal direction to output a normal image signal. The horizontal scanning circuit is also operative to scan the picture elements of the selected horizontal lines through the same horizontal side of the two-dimensional matrix in a second horizontal direction opposite the first horizontal direction to output a mirror image signal. Methods of reading a solid state imaging device to produce normal and mirror image signals therefrom include the steps of scanning a two-dimensional matrix of picture elements at a first side in a first direction to output a normal image signal and scanning the matrix at the first side in a second direction opposite the first direction to output a mirror image signal.

8 Claims, 5 Drawing Sheets

FIG.1

*(PRIOR ART)*

SOLID STATE IMAGING DEVICES FOR PRODUCING NORMAL AND MIRROR IMAGE SIGNALS WITH THE USE OF A REVERSIBLE SHIFT REGISTER

BACKGROUND OF THE INVENTION

The present invention relates to solid state imaging devices and methods for selectively producing normal and mirror image signals.

Video telephones serve to reproduce images of another with whom one is speaking by telephone, and in some cases, provide the ability to produce an image of oneself on the receiving monitor.

The image signal to be transmitted to the distant party is produced as a normal image signal by a television camera of the video telephone. The image of oneself, however, would appropriately be produced as a mirror image, and a normal image signal is not easily employed for this purpose.

Consequently, solid state image pickup devices have been provided with the capability of producing either a normal image signal or a mirror image signal. That is, with the use of such a device, a normal image signal can be transmitted to the other party at a distance, while the mirror image signal may be reproduced by a monitor to provide an image of oneself.

Solid state imaging devices include charge coupled devices (CCD's) having a plurality of picture elements each of which accumulates an electric charge representing an image. The accumulated charge is transmitted as is horizontally and vertically with respect to the device and ultimately converted into an electric image signal which is output by the device. Amplification-type solid state imaging devices, such as MOS-type and JFET-type devices, accumulate charge to develop an image which is read from each of a plurality of picture elements via a respective vertical signal line to a horizontal signal line to be output as an electric image signal.

Figure 1:
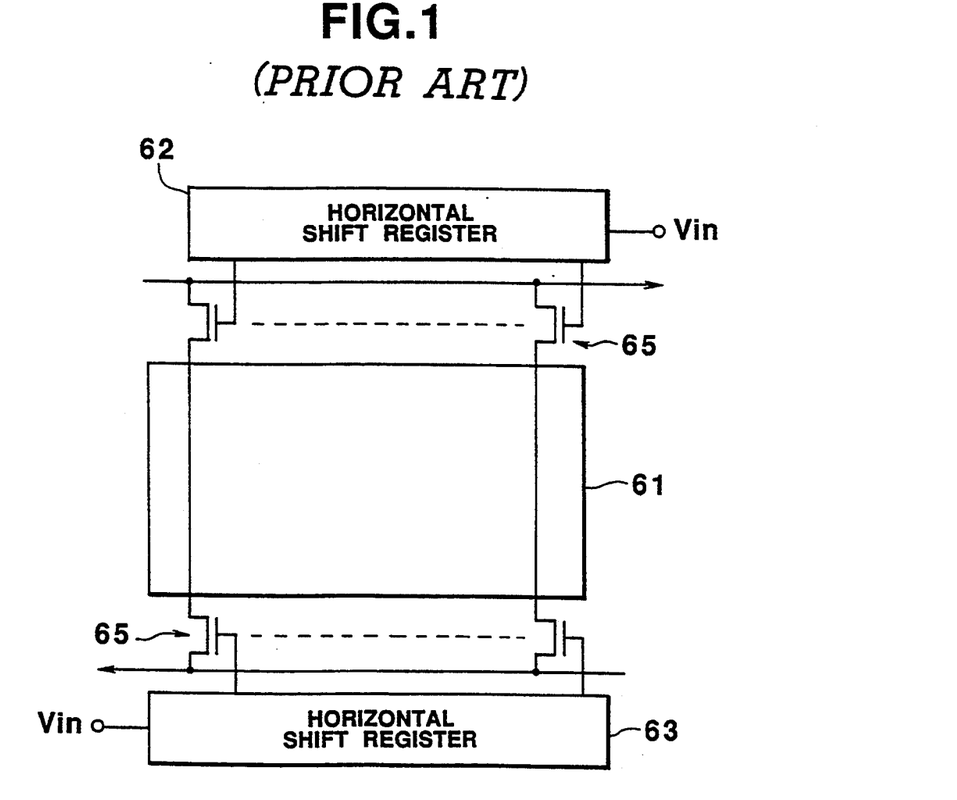
FIG. 1 is block diagram of a conventional solid state image pickup device providing both normal and mirror image readout capabilities.

A conventional amplification-type solid state image pickup device capable of producing either a normal image signal or a mirror image signal is illustrated in FIG. 1 hereof. With respect to FIG. 1, the device includes an image sensor portion 61 coupled with output switches 65 both at an upper horizontal side thereof as well as at a lower horizontal side thereof. The gates of the switches 65 at the upper horizontal side are each coupled with a respective output of an upper horizontal shift register 62 which serves, for example, to control output of a mirror image signal from the device by scanning the upper switches 65 in a first horizontal direction. The gates of the switches 65 at the lower horizontal side are each coupled with a respective output of a horizontal shift register 63 which serves to control output of a normal image signal from the device by scanning the lower switches 65 in a second horizontal direction opposite the first direction.

The device of FIG. 1 suffers the disadvantage that two horizontal shift registers and two sets of output switches are required, thereby adding a complexity to the device which is not present in imaging devices which produce only a normal image signal and, thus, require only a single horizontal shift register and associated switches. Where both the image sensor portion as well as the shift registers and switches are fabricated on a single substrate, substrate space occupied by the second shift register and associated switches reduces the space available for the image portion, thus reducing the achievable image resolution.

OBJECTS AND SUMMARY OF THE INVENTION

It is an object of the present invention to alleviate the shortcomings and disadvantages of prior art imaging devices.

It is another object of the present invention to provide solid state imaging devices having the ability to produce both normal and mirror image signals while minimizing circuit complexity.

It is a further object of the present invention to provide such solid state imaging devices having improved image resolution.

It is still another object of the present invention to provide such solid state imaging devices which maximize the space available on the substrate for an image sensor portion.

In accordance with an aspect of the present invention, a solid state imaging device comprises an image sensor including a two-dimensional matrix of picture elements arranged horizontally and vertically therein to form a plurality of vertically spaced horizontal lines thereof, the image sensor further including a plurality of vertical lines each coupling vertically disposed ones of the picture elements; a vertical scanning means for selecting the horizontal lines in a predetermined order for reading the picture elements thereof; and a horizontal scanning means coupled with the plurality of vertical lines on one horizontal side of the two-dimensional matrix for selecting picture elements in the selected horizontal lines to output image signals therefrom; the horizontal scanning means being operative to scan the picture elements of the selected horizontal lines through said one horizontal side of the two-dimensional matrix in a first horizontal direction to output a normal image signal, and being operative to scan the picture elements of the selected horizontal lines through said one horizontal side of the two-dimensional matrix in a second horizontal direction opposite the first horizontal direction to output a mirror image signal. Since the horizontal scanning means is operative to scan in the first and second directions, although coupled with the vertical lines on one horizontal side of the two-dimensional matrix, it is possible to employ a single device, such as a reversible shift register, to implement such a horizontal scanning means. This affords the ability to reduce the complexity of the device. In addition, when the device including both the image sensor as well as the vertical and horizontal scanning means, is fabricated on a common substrate, it is possible to dedicate a larger portion of the substrate to the image sensor, thus providing the ability to achieve greater image resolution by maximizing the number of picture elements employed.

In accordance with another aspect of the present invention, a solid state imaging device comprises an image sensor including a two-dimensional matrix of picture elements arrayed horizontally and vertically therein to form a plurality of vertically spaced horizontal lines thereof, the image sensor further including a plurality of vertical lines each coupling vertically disposed ones of the picture elements; a vertical scanning circuit operative to supply a vertical scanning signal to a selected one of the horizontal lines to enable reading of the picture elements therein; a plurality of switching circuits each having an ON state and an OFF state, each of the switching circuits having an input coupled with a respective one of the plurality of vertical lines, an output for providing an image signal from the respective vertical line during the ON state of the switching circuit and a control input for receiving a switching control signal to control the state of the switching circuit; and a reversible shift register having a plurality of shift register stages each having a respective output terminal coupled with a respective control input of at least one Corresponding switching circuit to supply a horizontal scanning signal thereto to turn the at least one corresponding switching circuit ON such that the image signal from the respective vertical line is provided at the output of the at least one corresponding switching circuit, the reversible shift register being operative in a first selectable mode to shift the horizontal scanning signal in a first direction from stage to stage of the reversible shift register to scan the vertical signal lines from a first side of the two-dimensional matrix to a second side thereof, the reversible shift register being operative in a second selectable mode to shift the horizontal scanning signal in a second direction from stage to stage of the reversible shift register to scan the vertical signal lines from the second side of the two-dimensional matrix to the first side thereof. The use of a reversible shift register minimizes the circuit complexity required to carry out either normal or mirror image signal production with the use of a solid state imaging device. The device in accordance with this aspect of the present invention also minimizes the substrate area required for horizontal scanning circuitry when such a device is fabricated on a common substrate, thus permitting a greater number of picture elements to be included on the substrate and greater resolution than heretofore has been possible.

In accordance with a further aspect of the present invention, a method of scanning a solid state imaging device for reading normal and mirror image signals therefrom is provided. The solid state imaging device comprises an image sensor including a two-dimensional matrix of picture elements arranged horizontally and vertically therein to form a plurality of vertically spaced horizontal lines thereof, the two-dimensional matrix having a first horizontal side, a second horizontal side, a first vertical side and a second vertical side, the image sensor further including a plurality of vertical lines each coupling vertically disposed ones of the picture elements. The method comprises the steps of selecting the horizontal lines in a predetermined order for reading the picture elements thereof; reading the picture elements of a selected horizontal line to form a normal image by scanning the plurality of vertical lines at the first horizontal side in a first direction from the first vertical side of the two-dimensional matrix of picture elements toward the second vertical side thereof; and reading the picture elements of a selected horizontal line to form a mirror image signal by scanning the plurality of vertical lines at said first horizontal side in a second direction from the second vertical side of the two-dimensional matrix of picture elements toward the first vertical side thereof.

The above, and other objects, features and advantages of the invention, will be apparent in the following detailed description of certain illustrative embodiments thereof which is to be read in connection with the accompanying drawings forming a part hereof, and wherein corresponding parts and components are identified by the same reference numerals in the several views of the drawings.

As used herein, expressions such as "downwardly", "upwardly", "upper", "lower", "above", "below", "horizontal", "vertical", "left" and "right" when referring to elements of the devices and methods disclosed and/or claimed herein are used in this application to express relative positions and directions, rather than positions and directions with respect to a fixed reference. It is intended that these terms should be broadly construed. Their use herein is for convenience and to promote a clear understanding of the present invention.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF CERTAIN ADVANTAGEOUS EMBODIMENTS

Figure 2:
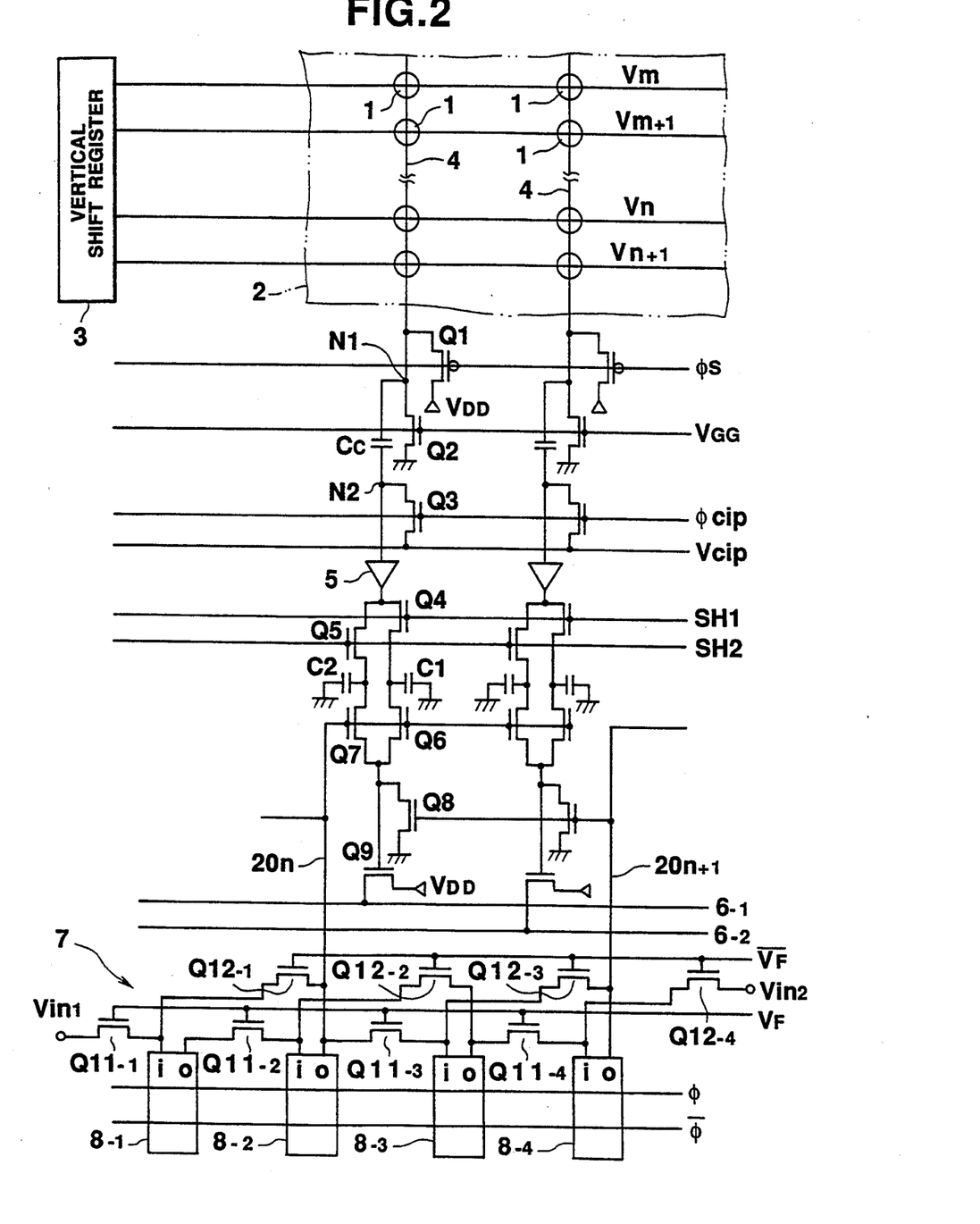
FIG. 2 is a partially block and partially schematic diagram of a solid state imaging device in accordance with the first embodiment of the present invention.

With reference to the drawings, and initially to FIG. 2 thereof, a first embodiment of a solid state imaging device in accordance with the present invention is illustrated therein. The solid state imaging device of FIG. 2 includes an image sensor portion 2 in which a plurality of picture elements 1, symbolized by circles in FIG. 2 for purposes of simplicity and clarity, are disposed in vertical lines or columns and horizontal lines or rows to form a two-dimensional matrix extending in vertical and horizontal directions as depicted. The picture elements 1 may be, for example, amplification-type devices, such as MOS or JFET devices. The picture elements of each horizontal line are joined with a respective output of a vertical shift register 3 which serves as a vertical scanning circuit to select each of the lines in succession by applying an appropriate scanning pulse thereto in order to read image signals accumulated in each of the picture elements 1 to a respective vertical line 4. That is, during each horizontal scanning period of an image signal produced with the use of the device of FIG. 2, a single output of the vertical shift register 3 is at a "one" state, while all remaining outputs are at a "zero" state, such that the single output at the "one" state selects the corresponding horizontal line of picture elements 1 to read during that horizontal scanning period. After each period, the "one" state is shifted vertically to the next stage of the shift register in order to read a corresponding, further horizontal line of the image sensor portion 2.

The embodiment of FIG. 2 also includes image signal read circuitry for reading the image signals accumulated in the picture elements 1 by correlation double sampling. Each of the vertical signal lines 4 is connected through a lower horizontal side of the image portion 2 to a node N1 of a respective one of a plurality of read circuits, a representative one of which is described hereinafter.

The node N1 of the representative read circuit is connected to a first terminal of the source-drain circuit of an n-channel transistor Q1, the second terminal of the source-drain circuit of transistor Q1 being coupled with a power source voltage $V_{DD}$. Node N1 is also connected with a first terminal of the source-drain circuit of a p-channel transistor Q2, the second terminal of its source-drain circuit being coupled to ground. Transistor Q1 serves as a gate for the output of the respective vertical signal line 4 under the control of a signal $\phi S$ supplied to its gate. Transistor Q2 serves as a load for the respective signal line 4 and receives an appropriate biasing voltage $V_{GG}$ at its gate.

A noise removal capacitor $C_c$ has a first terminal connected to node N1 and a second terminal connected to a node N2 and serves to accumulate a signal output from the respective signal line 4 under the control of gate transistor Q1. The first terminal of the source-drain circuit of an MOS transistor Q3 is connected to node N2, the second terminal of the source-drain circuit being coupled to receive a clamp voltage $V_{clp}$. The gate of transistor Q3 is provided with a clamp pulse $\phi_{clp}$ which turns on transistor Q3 to clamp the node N2 to $V_{clp}$ such that noise, such as reset noise, is suppressed in the image signal read through correlation double sampling.

Node N2 is also connected with the input of a buffer 5 which serves to couple the image signal selectively to the first terminal of one of a pair of capacitors C1 and C2 through the source-drain circuit of a respective one of a pair of MOS switching transistors Q4 and Q5. The second terminal of each of capacitors C1 and C2 is coupled with ground. Each of the capacitors C1 and C2 together with its respective switching transistor Q4 and Q5 forms a sample and hold circuit for an image signal read from the corresponding picture element of a selected horizontal line. Control of each of switching transistors Q4 and Q5 is exercised by a respective one of a pair of sample and hold signals SH1 and SH2 supplied to the gate thereof. During successive horizontal periods, an alternate one of the transistors Q4 and Q5 is turned on during the horizontal blanking interval by a respective signal SH1 and SH2, so that capacitor C1 serves to accumulate and hold image signals of even numbered ones of the horizontal lines while capacitor C2 serves to accumulate and hold image signals of odd numbered ones of the horizontal lines.

The first terminal of capacitor C2 is coupled with a first terminal of the source-drain circuit of an MOS switching transistor Q7, while the first terminal of capacitor C1 is connected with the first terminal of the source-drain circuit of another MOS switching transistor Q6. The second terminal of the source-drain circuit of each of transistors Q6 and Q7 is connected in common to the gate of a further MOS transistor Q9. A first terminal of the source-drain circuit of transistor Q9 is coupled with voltage source $V_{DD}$ while the second terminal thereof is coupled with one of a pair of horizontal signal lines $6_{-1}$ and $6_{-2}$. Each of the horizontal signal lines $6_{-1}$ and $6_{-2}$ is coupled with alternate ones of the plurality of read circuits through the source-drain circuits of respective transistors Q9. Each of the plurality of read circuits also includes an MOS reset transistor Q8 having a first terminal of its source-drain circuit connected with the gate of transistor Q9 and a second terminal thereof coupled to ground.

A horizontal shift register 7 has a plurality of outputs $\ldots$, $20_n$, $20_{n+1}$, $\ldots$ (where n is an integer), each of which is coupled with the gates of the transistors Q6 and Q7 of each of a first respective pair of adjacent ones of the plurality of read circuits to control the switching states thereof, as well as to the gates of transistors Q8 of each of an adjacent, second respective pair of the plurality of read circuits. For purposes of simplicity and clarity only two successive ones of the outputs $20_n$ and $20_{n+1}$ of the horizontal shift register 7 are illustrated in FIG. 2.

The horizontal shift register 7 includes a plurality of successively arranged inverters $\ldots$, $8_{-1}$, $8_{-2}$, $8_{-3}$, $8_{-4}$, $\ldots$ each having an input terminal i and an output terminal o. A first group of MOS switch transistors $\ldots$ $Q11_{-1}$, $Q11_{-2}$, $Q11_{-3}$, $Q11_{-4}$, $\ldots$ is provided, each having a source-drain circuit coupled between the output terminal o of a first respective one of the inverters $8_{-n}$ (where n is an integer) and the input terminal of a second respective one of the inverters $8_{-(n+1)}$. That is, each of the transistors $\ldots$, $Q11_{-1}$, $Q11_{-2}$, $Q11_{-3}$, $Q11_{-4}$, $\ldots$, when the same is turned on, serves to couple the output terminal of the first respective one of the inverters $8_{-(n)}$ to the input terminal of the second respective one of the inverters $8_{-(n+1)}$. As depicted in FIG. 2, voltage $Vin_1$ supplied to transistor $Q11_{-1}$ represents an output of an inverter to the left of inverter $8_{-1}$. Alternatively, $Vin_1$ represents a start pulse applied to the left-most one of the inverters $\ldots$, $8_{-1}$, $8_{-2}$, $8_{-3}$, $8_{-4}$, $\ldots$ A second group of switch transistors $\ldots$, $Q12_{-1}$, $Q12_{-2}$, $Q12_{-3}$, $Q12_{-4}$, $\ldots$ is also provided, each having a source-drain circuit coupled between the input terminal i of a first respective one of the inverters $8_{-n}$ and the output terminal of the second respective one of the inverters $8_{-(n+1)}$. That is, each of the transistors $\ldots$, $Q12_{-1}$, $Q12_{-2}$, $Q12_{-3}$, $Q12_{-4}$, $\ldots$, when the same is turned on, serves to couple the input terminal of the first respective one of the inverters $8_{-n}$ to the output terminal of the second respective one of the inverters $8_{-(n+1)}$. As depicted in FIG. 2, voltage $Vin_2$ supplied to transistor $Q12_{-4}$ represents an output of an inverter to the right of inverter $8_{-4}$. Alternatively, $Vin_2$ represents a start pulse applied to the right-most one of the inverters $\ldots$, $8_{-1}$, $8_{-2}$, $8_3$, $8_{-4}$, $\ldots$. The first and second groups of the MOS switch transistors may, for example, comprise N-MOS, P-MOS or C-MOS types.

The gates of the first group of MOS switch transistors are connected in common by a first control line to receive a control voltage $V_F$, while the gates of the second group of MOS switch transistors are connected in common by a second control line to receive the inverse of the control voltage $V_F$. Accordingly, when the control voltage $V_F$ is at a first level such that the first group of switch transistors $\ldots$ $Q11_{-1}$, $Q11_{-2}$, $Q11_{-3}$, $Q11_{-4}$, $\ldots$ is turned on, the second group of switch transistors $\ldots$, $Q12_{-1}$, $Q12_{-2}$, $Q12_{-3}$, $Q12_{-4}$, $\ldots$ is simultaneously turned off. Consequently, in the presence of the first level of the control voltage $V_F$, the output of each of the inverters $\ldots$ $8_{-1}$, $8_{-2}$, $8_{-3}$, $8_{-4}$, $\ldots$ is provided as an input to the inverter immediately to the right thereof as depicted in FIG. 2, thus to permit shifting of a horizontal scanning signal from left to right within the horizontal shift register 7. As a result, the picture elements 1 of each horizontal line selected to be read are scanned in this process from left to right to produce a normal image signal.

Conversely, when the control voltage $V_F$ is at a second level such that the first group of switch transistors is turned off, the second group of switch transistors ..., $Q12_{-1}$, $Q12_{-2}$, $Q12_{-3}$, $Q12_{-4}$, ... is simultaneously turned on. Consequently, the output of each of the inverters ..., $8_{-1}$, $8_{-2}$, $8_{-3}$, $8_{-4}$, ... is provided as an input to the inverter immediately to the left thereof as depicted in FIG. 2, thus to permit shifting of the horizontal scanning signal from right to left within the horizontal shift register 7. As result, the picture elements 1 are read from right to left as shown in FIG. 2 to produce a mirror image signal.

Figure 3:
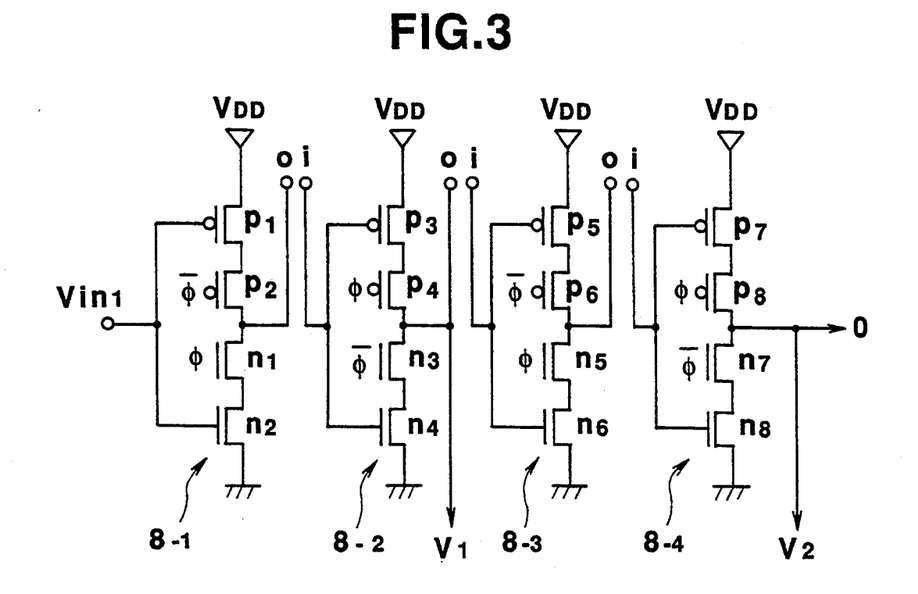
FIG. 3 is a schematic diagram of a horizontal shift register adapted for use in the embodiment of FIG. 2.

With reference now to FIG. 3, a schematic diagram of the inverter stages ..., $8_{-1}$, $8_{-2}$, $8_{-3}$, $8_{-4}$, ... is provided thereby. As seen in FIG. 3, inverter $8_{-1}$ includes a first p-channel MOS transistor $P_1$ whose source-drain circuit is coupled between an electric power source voltage $V_{DD}$ and the drain of a second p-channel MOS transistor $P_2$. The source of transistor $P_2$ is coupled with the source of a first n-channel MOS transistor $n_1$. The drain of transistor $n_1$ is coupled with a first terminal of the source-drain circuit of a second n-channel MOS transistor $n_2$, the other terminal of which is coupled to ground. The gates of transistors $P_1$ and $n_2$ are commonly coupled with an input terminal of the inverter $8_{-1}$ to receive the input signal $Vin_1$. The output terminal of inverter $8_{-1}$ is coupled with the sources of the transistors $P_2$ and $n_1$.

Inverter $8_{-2}$ is constructed in the same fashion as inverter $8_{-1}$ such that p-channel MOS transistors $P_3$ and $P_4$ and n-channel MOS transistors $n_3$ and $n_4$ of inverter $8_{-2}$ are coupled in the same manner as transistors $P_1$, $P_2$, $n_1$ and $n_2$, respectively, of inverter $8_{-1}$. The output of inverter $8_{-2}$, indicated as $V_1$ is coupled with output $20_n$ of the shift register 7, as illustrated in FIG. 2.

Inverter $8_{-3}$ likewise is constructed in the same fashion as inverter $8_{-1}$ such that inverter $8_{-3}$ includes p-channel MOS transistors $P_5$ and $P_6$ and n-channel MOS transistors $n_5$ and $n_6$ coupled in the same manner as transistors $P_1$, $P_2$, $n_1$ and $n_2$, respectively, of inverter $8_{-1}$.

The fourth inverter $8_{-4}$, as illustrated in FIG. 3, is constructed in the same fashion as inverter $8_{-1}$ such that inverter $8_{-4}$ includes p-channel MOS transistors $p_7$ and $p_8$ and n-channel MOS transistors $n_7$ and $n_8$ coupled in the same fashion as transistors $p_1$, $p_2$, $n_1$ and $n_2$ of inverter $8_{-1}$. The output of inverter $8_{-4}$ is indicated as $V_2$ which is coupled with output $20_{n+1}$ of the horizontal shift register 7, as illustrated in FIG. 2.

When the inverters ..., $8_{-1}$, $8_{-2}$, $8_{-3}$, $8_{-4}$ are connected in the fashion illustrated in FIG. 2 and with the first group of switch transistors ..., $Q11_{-2}$, $Q11_{-3}$, $Q11_{-4}$, ... turned on, it will be seen that inverters $8_{-1}$ and $8_{-2}$ together form a first flip-flop corresponding with a respective pair of vertical signal lines which are read in response to the output thereof. In addition, it will be seen that inverters $8_{-3}$ and $8_{-4}$ together constitute another flip-flop adjacently coupled with the flip-flop formed by inverters $8_{-1}$ and $8_{-2}$, the output of the flip-flop formed by inverters $8_{-3}$ and $8_{-4}$ corresponding with a further pair of vertical signal lines read thereby. While the flip-flop stages of the shift register circuit 7 are formed with the use of dynamic circuitry, static circuits may instead be employed. Moreover, other types of flip-flop circuits suitable for use as the stages of a shift register may likewise be employed in place of the inverters $8_{-1}$ through $8_{-4}$.

A pair of clock pulses, $\phi$ and its inverse, are applied to each of the flip-flops thus constituted, such that in the flip-flop formed by inverters $8_{-1}$ and $8_{-2}$ the clock pulse $\phi$ is applied to the gates of transistors $n_1$ and $p_4$, while its inverse is applied to the transistors $p_2$ and $n_3$. In the case of the flip-flop formed by the inverters $8_{-3}$ and $8_{-4}$, the clock pulse $\phi$ is applied to the gates of transistors $n_5$ and $p_8$, while its inverse is applied to transistors $p_6$ and $n_7$.

Figure 4:
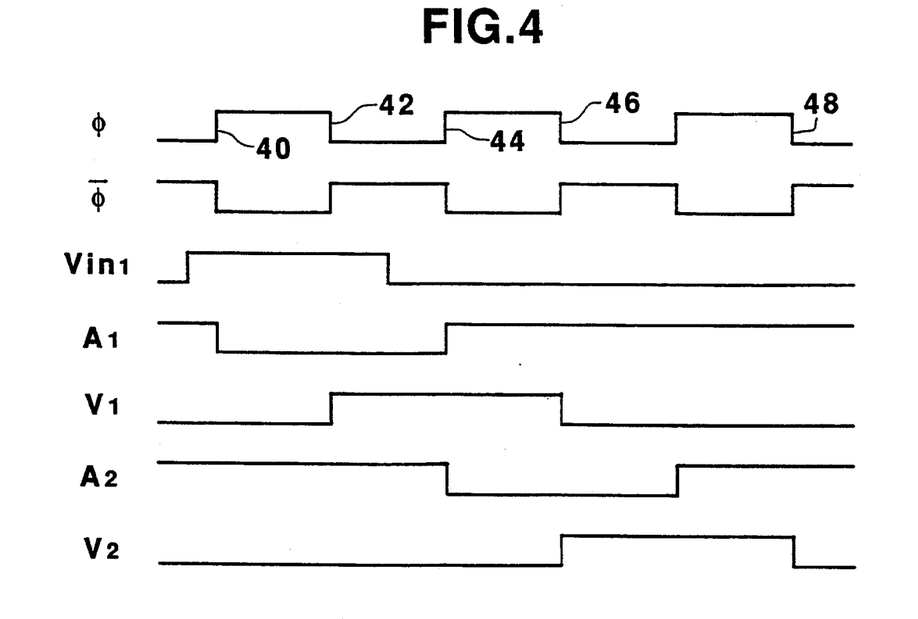
FIG. 4 is a timing chart for use in explaining the operation of a reversible shift register included in the embodiment of FIG. 2.

FIG. 4 provides a timing chart for use in explaining the manner in which the horizontal scanning signal is shifted through the various stages of the horizontal shift register 7 when the control voltage $V_F$ is at a level which turns on switch transistors ..., $Q11_{-1}$, $Q11_{-2}$, $Q11_{-3}$, $Q11_{-4}$, ... As shown in FIG. 4, at a first rising edge 40 of the clock pulse $\phi$, the concurrently high level of the input voltage $Vin_1$ results in a low level of the output A1 of the inverter $8_{-1}$. Upon the occurrence of the trailing edge 42 of a first clock pulse $\phi$, the level of the output $V_1$ of the inverter $8_{-2}$ is brought high in response to the simultaneously low level of the output of the A1 of inverter $8_{-1}$.

Subsequently, at the rising edge 44 of a second clock pulse $\phi$ the high level of the output $V_1$ of inverter $8_{-2}$ brings the output $A_2$ of the inverter $8_{-3}$ low, as indicated in FIG. 4. Thereafter, at the trailing edge 46 of the second clock pulse $\phi$ the output $V_2$ of the inverter $8_{-4}$ is brought high. At the same time, the output $V_1$ returns to a low state. In like manner, at the trailing edge 48 of a third clock pulse $\phi$, the level of the output $V_2$ returns to a low level.

It will be appreciated that, when the levels of the control signal $V_F$ and its inverse are selected such that the switching transistors $Q12_{-1}$ through $Q12_{-4}$ are turned on while the transistors $Q11_{-1}$ through $Q11_{-4}$ are turned off, the operation of the inverters illustrated in FIG. 3 will be reversed. That is, a high level of $Vin_2$ at the input of inverter $8_{-4}$ occurring at the leading edge of the first clock pulse $\phi$ will be clocked in by the inverter $8_{-4}$ to produce a low level on its output $V_2$. Further transitions of the clock pulse $\phi$ and its inverse will result in clocking of the pulse received originally at inverter $8_{-4}$ to the outputs of the inverters $8_{-4}$, $8_{-3}$, $8_{-2}$, $8_{-1}$, .... In this manner, a horizontal scanning pulse is shifted sequentially from right to left of the shift register stages formed by the inverters $8_{-1}$ through $8_{-4}$ as illustrated in FIGS. 2 and 3, thus to scan the picture elements of a selected horizontal line to form a mirror image signal.

It will be seen, therefore, that with the use of a single reversible shift register, such as that illustrated in FIGS. 2 and 3, it is possible to produce either a normal image signal or a mirror image signal with the use of a solid state imaging device. The embodiment of FIG. 2, including the image sensor portion 2, the vertical shift register 3, the image signal read circuitry, the shift register 7, the first and second groups of switch transistors, and associated circuitry, advantageously are fabricated on a single substrate. It will be appreciated that, by dispensing with the need for a second shift register, the embodiment of FIG. 2 provides an advantageously simplified horizontal scanning circuit arrangement permitting the use of a greater portion of the substrate by the image sensor portion. It will also be appreciated that one or more of the elements of the FIG. 2 embodiment may be fabricated on separate substrates while still realizing the advantage of a simplified circuit configuration.

Figure 5:
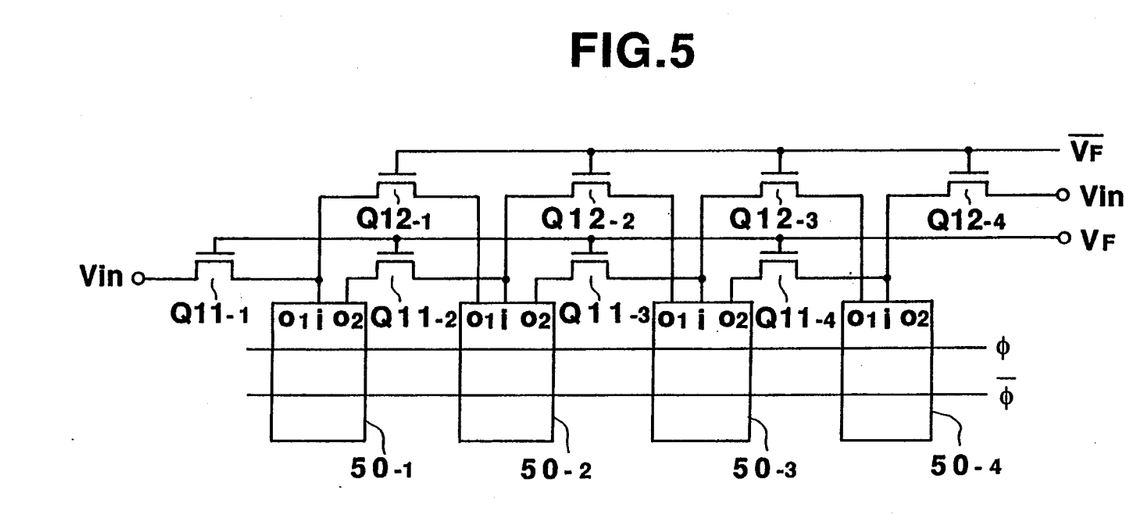
FIG. 5 is a partially block and partially schematic diagram of a reversible shift register for use in a second embodiment of the present invention.

FIG. 5 illustrates a further embodiment of a reversible shift register which may be employed in place of the shift register 7 of FIG. 2. The shift register of FIG. 5 is fabricated on the same substrate as the remainder of the device as depicted in FIG. 2. In the embodiment of FIG. 5 each of the inverters $8_{-1}$ through $8_{-4}$ is replaced by a respective one of inverters $50_{-1}$, $50_{-2}$, $50_{-3}$ and $50_{-4}$. Inverters $50_{-1}$ through $50_{-4}$ differ from inverters $8_{-1}$ through $8_{-4}$ in that each of the inverters $50_{-1}$ through $50_{-4}$ is provided with a pair of electrically common output terminals $o_1$ and $o_2$. It will be seen from FIG. 5 that the output terminal $o_1$ of each of inverters $50_{-1}$ through $50_{-4}$ is positioned on the substrate to a first side of the input of the respective inverter and that the other common output terminal $o_2$ is positioned on the substrate to a second side of the input terminal opposite the first side. As seen in FIG. 5, each of the switch transistors ... $Q11_{-2}$, $Q11_{-3}$, $Q11_{-4}$ ... is coupled between the input terminal i of a respective one of the inverters $50_{-n}$ (where n is an integer) and the output terminal $o_2$ of another respective one of the inverters $50_{-(n-1)}$, while each of the switching transistors ..., $Q12_{-1}$, $Q12_{-2}$, $Q12_{-3}$, ..., is coupled between the output $o_1$ of a respective one of the respective inverters $50_n$ and the input of another respective one of the inverters $50_{-(n-1)}$.

Since in the embodiment of FIG. 5, each inverter $50_{-n}$ is provided with a pair of electrically common output terminals $o_1$ and $o_2$, only one conductive contact need be made to each output terminal. This provides the advantage in the fabrication process that double connections to each output may be avoided, so that there is no need to form conductive contact between two different conductive layers and the output, thus to reduce the number of steps required.

Figure 6:
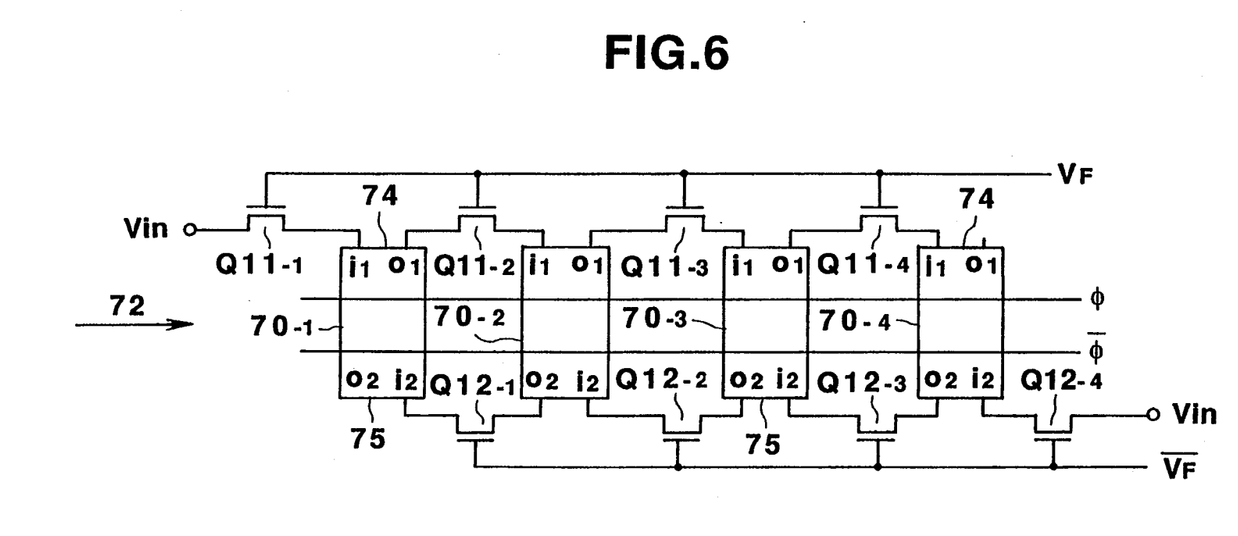
FIG. 6 is a partially block and partially schematic diagram of yet another reversible shift register for use in a further embodiment of the present invention.

Referring now to FIG. 6, still another embodiment of a reversible shift register which may be utilized in place of the horizontal shift register 7 of FIG. 2 is illustrated therein. In this embodiment, the shift register of FIG. 6 is fabricated on the same substrate as the remainder of the device as depicted in FIG. 2. As shown in FIG. 6, each of the inverters $8_{-1}$ through $8_{-4}$ of FIG. 2 has been replaced by a respective inverter $70_{-1}$, $70_{-2}$, $70_{-3}$ and $70_{-4}$ arranged in succession and in that order generally along a common axis indicated as 72 in FIG. 6. Each of the inverters $70_{-1}$ through $70_{-4}$ has first and second opposed sides 74 and 75 on opposing sides of the axis 72. Each of the inverters $70_{-1}$ through $70_{-4}$ is provided with a pair of electrically common input terminals $i_1$ and $i_2$ and a pair of electrically common output terminals $o_1$ and $o_2$. The electrically common input terminals $i_1$ and $i_2$ of each of the inverters are positioned at respectively different opposed sides thereof on the common substrate so that the input terminals $i_1$ and $i_2$ are arranged diagonally of the respective inverter. Each of the electrically common output terminals $o_1$ and $o_2$ of each inverter is arranged on the same side thereof as a respective one of the input terminals $i_1$ and $i_2$, such that the output terminals $o_1$ and $o_2$ are arranged diagonally on respective sides of the inverter.

Each of the switching transistors ..., $Q12_{-1}$, $Q12_{-2}$, $Q12_{-3}$, ... has its source-drain circuit coupled between the output $o_2$ of a first respective one of the inverters $70_{-n}$ and the input $i_2$ of a second respective one of the inverters $70_{-(n-1)}$, while each of the switching transistors ..., $Q11_{-2}$, $Q11_{-3}$, $Q11_{-4}$, ... has its source-drain circuit coupled between the input $i_1$ of a first respective one of the inverters $70_{-n}$ and the output $o_1$ of another respective one of the inverters $70_{-(n-1)}$.

It will be seen that the structure of the horizontal shift register illustrated in FIG. 6 avoids the need to form double connections at any of the inputs $i_1$ and $i_2$ and the outputs $o_1$ and $o_2$, so that the process for fabricating the shift register of FIG. 6 is further simplified as compared with that of the shift register of FIG. 5.

It will be seen from the foregoing that the present invention provides a solid state imaging device and method wherein either a normal image signal or a mirror image signal may be produced with the use of a single horizontal scanning circuit possessing the capability of producing a scanning signal in a selected one of opposing directions. Accordingly, the need for two horizontal scanning circuits, as in the case of conventional devices, may be avoided with the use of the present invention, so that the circuit complexity of solid state imaging devices in accordance with the present invention is reduced as compared with conventional devices. Moreover, the present invention provides the ability to fabricate a solid state imaging device having both normal and mirror image capabilities on a single substrate such that an image sensor portion of the device may be made advantageously large, employing a relatively large number of picture elements and providing the ability to improve the resolution of the image signals produced with the use of the device.

Although specific embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A solid state imaging device comprising:
   an image sensor including a two-dimensional matrix of picture elements arranged horizontally and vertically therein to form a plurality of vertically spaced horizontal lines thereof, the image sensor further including a plurality of vertical lines each coupling vertically disposed ones of the picture elements;
   a vertical scanning means for selecting the horizontal lines in a predetermined order for reading picture elements thereof; and
   a horizontal scanning means coupled with the plurality of vertical lines on one horizontal side of the two-dimensional matrix for selecting picture elements in the selected horizontal lines to output image signals therefrom;
   the horizontal scanning means being the picture elements of the selected horizontal lines through said one horizontal side of the two-dimensional matrix in a first horizontal direction to output a normal image signal, and being operative to scan the picture elements of the selected horizontal lines through said one horizontal side of the two-dimensional matrix in a second horizontal direction opposite the first horizontal direction to output a mirror image signal;
   the horizontal scanning means comprising a plurality of switching circuits each having an ON state and an OFF state and having an input coupled with a respective one of the plurality of vertical lines, each of the plurality of switching circuits having an output for providing an image signal from the respective vertical line during the ON state of the switching circuit and a control input for controlling the ON/OFF state thereof; and a horizontal shift register including a plurality of inverters arranged in successive pairs, each of said pairs having an output terminal coupled with the control input of a corresponding one of said plurality of switching circuits for controlling the ON/OFF state thereof, said horizontal shift register including mode control means for selectively coupling first, second and third successively arranged ones of said plurality of inverters such that, in a first mode of operation, an input of the second successively arranged inverter is coupled with an output of the first successively arranged inverter and, in a second mode of operation, the input of the second successively arranged inverter is coupled with an output of the third successively arranged inverter.

2. A solid state imaging device according to claim 1, wherein the mode control means comprises a first switch coupled between the input of the second successively arranged inverter and the output of the first successively arranged inverter and a second switch coupled between the input of the second successively arranged inverter and the output of the third successively arranged inverter, and means for selectively switching the first switch on and the second switch off in the first mode of operation and switching the first switch off and the second switch on in the second mode of operation.

3. A solid state imaging device according to claim 2, wherein the output of each of the first, second and third successively arranged inverters comprises first and second electrically common output terminals.

4. A solid state imaging device according to claim 3, wherein the plurality of inverters are fabricated on a common substrate, the first common output terminal of each of the first, second and third successively arranged inverters being positioned on the substrate to a first side of the input thereof and the second common output terminal thereof being positioned on the substrate to a second side of the input opposite the first side.

5. A solid state imaging device according to claim 3, wherein the input of each of the first, second and third successively arranged inverters comprises first and second electrically common input terminals, the first switch being coupled between the first input terminal of the second inverter and the first output terminal of the first inverter, and the second switch being coupled between the second input terminal of the second inverter and the second output terminal of the third inverter.

6. A solid state imaging device according to claim 5 wherein the plurality of inverters are fabricated on a common substrate such that the first, second and third successively arranged inverters are aligned generally along a common axis on the substrate, each of the first, second and third successively arranged inverters having first and second sides on opposite sides of the axis, the first input and first output terminals of each of the inverters being positioned on the first side thereof and the second input and second output terminals being positioned on the second side thereof such that the input terminals of each inverter are arranged diagonally on respective sides thereof and the output terminals of each inverter are arranged diagonally on respective sides thereof.

7. A solid state imaging device according to claim 1, wherein each of the plurality of inverters comprises a first p-type MOS transistor, a second p-type MOS transistor, a first n-type MOS transistor and a second n-type MOS transistor connected in series between an electric power source voltage and a ground, the gates of the first p-type MOS transistor and the second n-type MOS transistor are commonly connected to form the input of the inverter, and the sources of the second p-type MOS transistor and the first n-type MOS transistor are commonly connected to form the output of the inverter.

8. A solid state imaging device according to claim 1, wherein the image sensor, the vertical scanning means and the horizontal scanning means are fabricated on a common substrate.

* * * * *